US012593218B2

(12) United States Patent
Chiang et al.

(10) Patent No.: US 12,593,218 B2
(45) Date of Patent: Mar. 31, 2026

(54) SPECTRUM INQUIRY METHOD AND DEVICE FOR AUTOMATIC FREQUENCY COORDINATION PROTOCOL

(71) Applicant: Nanning FuLian FuGui Precision Industrial Co., Ltd., Nanning (CN)

(72) Inventors: Chia-An Chiang, New Taipei (TW); Chen-Chang Ho, New Taipei (TW); Chia-Ming Chang, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 252 days.

(21) Appl. No.: 18/518,507

(22) Filed: Nov. 23, 2023

(65) Prior Publication Data

US 2024/0196225 A1 Jun. 13, 2024

(30) Foreign Application Priority Data

Dec. 12, 2022 (CN) .......................... 202211596736.0

(51) Int. Cl.
| | |
|---|---|
| *H04W 16/14* | (2009.01) |
| *H04W 12/08* | (2021.01) |
| *H04W 52/16* | (2009.01) |
| *H04W 84/12* | (2009.01) |

(52) U.S. Cl.
CPC ........... *H04W 16/14* (2013.01); *H04W 12/08* (2013.01); *H04W 52/16* (2013.01); *H04W 84/12* (2013.01)

(58) Field of Classification Search
CPC ..... H04W 16/14; H04W 12/08; H04W 52/16; H04W 84/12; H04W 72/0473; H04W 72/0453; H04L 63/123
USPC ......................................................... 455/522
See application file for complete search history.

(56) References Cited

U.S. PATENT DOCUMENTS

| | | | |
|---|---|---|---|
| 2020/0145836 A1 | 5/2020 | Smith | |
| 2022/0330363 A1 | 10/2022 | Taneja et al. | |
| 2024/0015519 A1* | 1/2024 | Silverman | ............. H04W 16/14 |

FOREIGN PATENT DOCUMENTS

| | | |
|---|---|---|
| CN | 106688243 A | 5/2017 |
| TW | I468051 B | 1/2015 |
| WO | 2022/249151 A1 | 12/2022 |

* cited by examiner

*Primary Examiner* — Eugene Yun
(74) *Attorney, Agent, or Firm* — ScienBiziP, P.C.

(57) ABSTRACT

In a spectrum query method for automatic frequency coordination protocol applied to an automatic frequency coordination protocol device, an automatic frequency coordination server is inquired for information of adjacent automatic frequency coordination devices corresponding to the automatic frequency coordination device, and an adjacent device list corresponding to the automatic frequency coordination device is obtained; spectrum information of the adjacent automatic frequency coordination devices in the adjacent device list is obtained, and whether to inquire from the automatic frequency coordination server and update the spectrum information of the automatic frequency coordination devices is determined according to the spectrum information.

8 Claims, 3 Drawing Sheets

SPECTRUM INQUIRY METHOD AND DEVICE FOR AUTOMATIC FREQUENCY COORDINATION PROTOCOL

CROSS-REFERENCE TO RELATED APPLICATIONS

This application claims priority to Chinese Patent Application No. 202211596736.0 filed on Dec. 12, 2022, in China State Intellectual Property Administration, the contents of which are incorporated by reference herein.

FIELD

The subject matter herein generally relates to spectrum query technology of automatic frequency coordination protocol, in particular to a spectrum inquiry method and device for automatic frequency coordination protocol.

BACKGROUND

The Federal Communications Commission (FCC) of the United States stipulates that in the WiFi 6E/7 standard, the wireless access point (AP) can only use low power for transmission in the 6 GHz frequency band. The AP needs to inquiry an automated frequency coordination (AFC) server to use the maximum power returned by the automated frequency coordination server to transmit in certain 6 GHz frequency bands.

However, the FCC only stipulates that the AP needs to inquiry the automatic frequency coordination server at least once a day. Therefore, how to efficiently update the spectrum transmission power is a problem. Furthermore, the information returned by the automatic frequency coordination server does not have complete identity verification and integrity checks, and attackers may tamper with backhaul messages through man-in-the-middle attacks to subvert automatic frequency coordination protocols.

BRIEF DESCRIPTION OF THE DRAWINGS

Implementations of the present technology will now be described, by way of example only, with reference to the attached figures, wherein.

DETAILED DESCRIPTION

Figure 1:
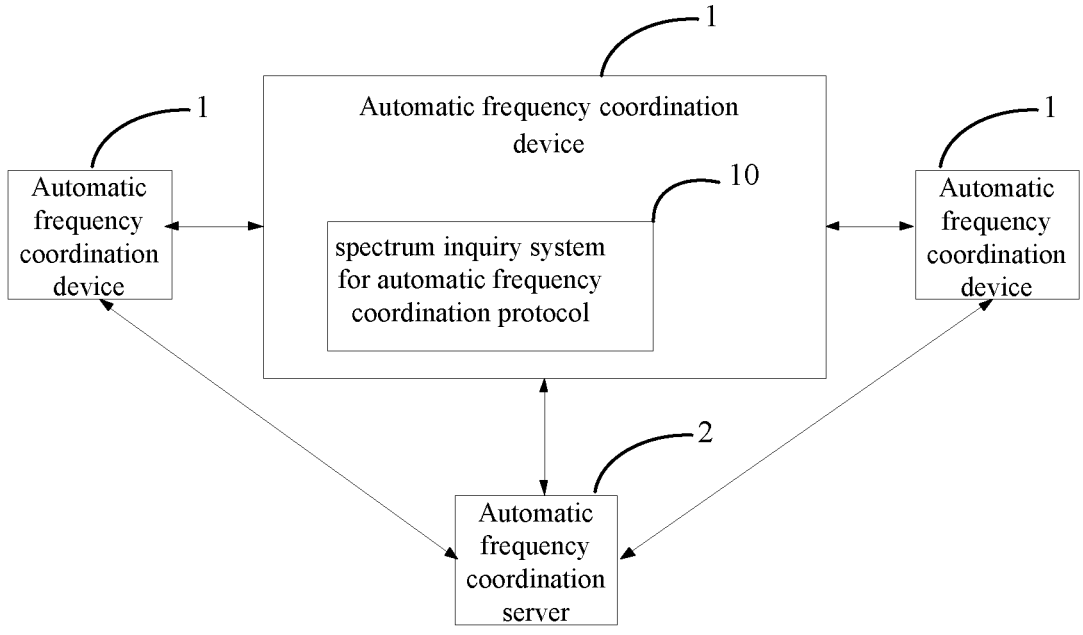
FIG. 1 is an operating environment diagram of a preferred embodiment of an automatic frequency coordination device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

References to "an" or "one" embodiment in this disclosure are not necessarily to the same embodiment, and such references mean "at least one".

In general, the word "module" as used herein after, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Referring to FIG. 1, FIG. 1 is an operating environment diagram of a preferred embodiment of an automatic frequency coordination device 1 of the present disclosure. The automatic frequency coordination device 1 communicates with an automatic frequency coordination server 2 and adjacent automatic frequency coordination devices 1. The automatic frequency coordination device 1 also includes a spectrum inquiry system 10 for automatic frequency coordination protocol, which is used to run a spectrum inquiry program for automatic frequency coordination protocol.

Figure 2:
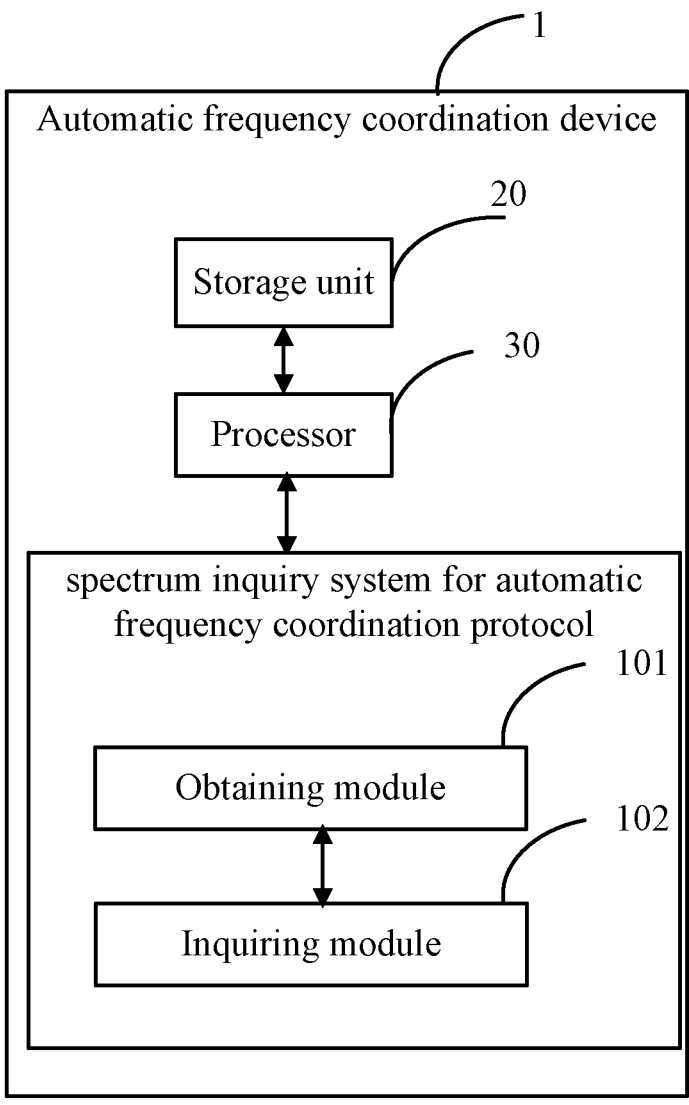
FIG. 2 illustrates an exemplary embodiment of functional modules of a spectrum inquiry system for automatic frequency coordination protocol.

FIG. 2 illustrates an exemplary embodiment of functional modules of a spectrum inquiry system 10 for automatic frequency coordination protocol. The spectrum inquiry system 10 for automatic frequency coordination protocol includes an obtaining module 101 and an inquiring module 102. The spectrum inquiry system 10 for automatic frequency coordination protocol further includes a storage unit 20, and a processor 30. The modules are configured to be executed by one or more processors (in the embodiment, one processor 30). The modules referred to are computer program segments that perform specific instructions. The storage unit 20 is used to store program code and other data of the spectrum inquiry system 10 for automatic frequency coordination protocol. The processor 30 is used to execute the program code stored in the storage unit 20.

The storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk, and other components. The processor 30 may be a central processing unit (CPU), a controller, a microcontroller, a microprocessor, or other data processing chip.

The obtaining module 101 is configured to inquire an automatic frequency coordination server 2 for information of adjacent automatic frequency coordination devices 1 corresponding to the automatic frequency coordination device 1, and obtain an adjacent device list corresponding to the automatic frequency coordination device 1.

Specifically, the obtaining module 101 inquires the automatic frequency coordination server 2 for information of adjacent automatic frequency coordination devices through vendorExtensions, and the automatic frequency coordination server counts the adjacent device list according to geographic location information of all automatic frequency coordination devices.

The inquiring module 102 is configured to obtain spectrum information of the adjacent automatic frequency coordination devices in the adjacent device list, and determine, according to the spectrum information, whether to inquire from the automatic frequency coordination server and update the spectrum information of the automatic frequency coordination devices.

Specifically, the inquiring module 102 inquires the adjacent automatic frequency coordination devices 1 in the adjacent device list through vendorExtensions to obtain spectrum information, and the spectrum information includes at least spectrum transmission power, and may also include Wi-Fi channels, frequency bands and so on.

The inquiring module 102 further actively inquires the adjacent automatic frequency coordination devices to obtain the spectrum information.

The inquiring module 102 actively inquires the adjacent automatic frequency coordination devices to obtain the spectrum information, and determines, according to the spectrum information, whether to inquire from the automatic frequency coordination server 2 and update the spectrum information of the automatic frequency coordination devices 1. Specifically, refer to following blocks:

In block a, the automatic frequency coordination server 2 is inquired for the spectrum information of the automatic frequency coordination device 1 itself, and a first spectrum information of the automatic frequency coordination device 1 itself is stored.

Specifically, the inquiring module 102 provides serial number, geographic location and other device description information of the automatic frequency coordination device 1 to the automatic frequency coordination server 2, and the automatic frequency coordination server 2 returns the frequency spectrum of the automatic frequency coordination device 1 itself according to the serial number, geographic location and other device description information.

In block b, the automatic frequency coordination server 2 is inquired for the adjacent device list corresponding to the automatic frequency coordination device 1.

In block c, the adjacent automatic frequency coordination devices 1 in the adjacent device list are inquired for a second spectrum information of the adjacent automatic frequency coordination devices 1.

In block d, a difference degree $\Delta$ between the first spectral information and the second spectral information is calculated.

In block e, if the difference degree $\Delta$ exceeds a threshold value, a preset time period T is waited and then steps a to d are repeatedly executed, and execution times are accumulated.

In block f, if the difference degree $\Delta$ exceeds the threshold value for N consecutive times, a system administrator is notified, wherein the N is a preset positive integer greater than 1.

In the embodiment, under normal circumstances, the difference degree between the spectrum information of adjacent automatic frequency coordination devices 1 is not large. Therefore, by actively inquiring about the spectrum information of adjacent automatic frequency coordination devices, whether there is a risk of tampering with the spectrum information obtained by the automatic frequency coordination server 2 can be evaluated.

Furthermore, the inquiring module 102 further passively obtains the spectrum information of the adjacent automatic frequency coordination devices.

The inquiring module 102 passively obtains the spectrum information of the adjacent automatic frequency coordination devices 1, and determines, according to the spectrum information, whether to inquire from the automatic frequency coordination server 2 and update the spectrum information of the automatic frequency coordination devices. Specifically:

First, the automatic frequency coordination server 2 is inquired for the spectrum information of the automatic frequency coordination device 1 itself, and a third spectrum information of the automatic frequency coordination device 1 itself is stored.

Second, a fourth spectrum information of the adjacent automatic frequency coordination devices 1 sent by the adjacent automatic frequency coordination devices 1 is received.

Third, difference degree $\Delta$ between the third spectral information and the fourth spectral information is calculated.

Fourth, if the difference degree $\Delta$ exceeds the threshold value, then the automatic frequency coordination server 2 is inquired again for the spectrum information of the automatic frequency coordination device 1 itself, and the spectrum information is updated to latest spectrum information returned by the automatic frequency coordination server 2.

In the embodiment, the first spectrum information, the second spectrum information, the third spectrum information, and the fourth spectrum information are only for convenience of description, and are not intended to limit functions.

In the embodiment, in order to inquire the spectrum information from the automatic frequency coordination server 2 more intelligently, when the spectrum information of the automatic frequency coordination device 1 is updated, the automatic frequency coordination device 1 actively updates the updated spectrum information to the adjacent automatic frequency coordination devices 1. In this way, after receiving the spectrum information of the adjacent automatic frequency coordination devices 1, the automatic frequency coordination device 1 can calculate the spectrum difference degree $\Delta$ with its own spectrum information. If the difference degree $\Delta$ exceeds the threshold value, the automatic frequency coordination device 1 will immediately update the spectrum information with the automatic frequency coordination server 2. If the difference degree $\Delta$ does not exceed the threshold value, there is no need to update the spectrum information to the automatic frequency coordination server 2.

Therefore, by passively obtaining the spectrum information of the adjacent automatic frequency coordination devices, the automatic frequency coordination device can evaluate whether it needs to inquire the frequency spectrum with the automatic frequency coordination server, so as to achieve more efficient spectrum updating.

In the embodiment, the automatic frequency coordination device queries the automatic frequency coordination server for the information of adjacent automatic frequency coordination devices to obtain a list of adjacent devices, and then the adjacent automatic frequency coordination devices are actively and passively inquired to obtain spectrum information. In this way, actively asking for spectrum information of adjacent devices can be used to assess whether the spectrum information obtained through the automatic frequency coordination server has the risk of being tampered with. The passively obtained spectrum information of adjacent devices can allow the automatic frequency coordination device to evaluate whether it needs to inquire about the frequency spectrum with the automatic frequency coordination server, so as to achieve more efficient spectrum update.

Figure 3:
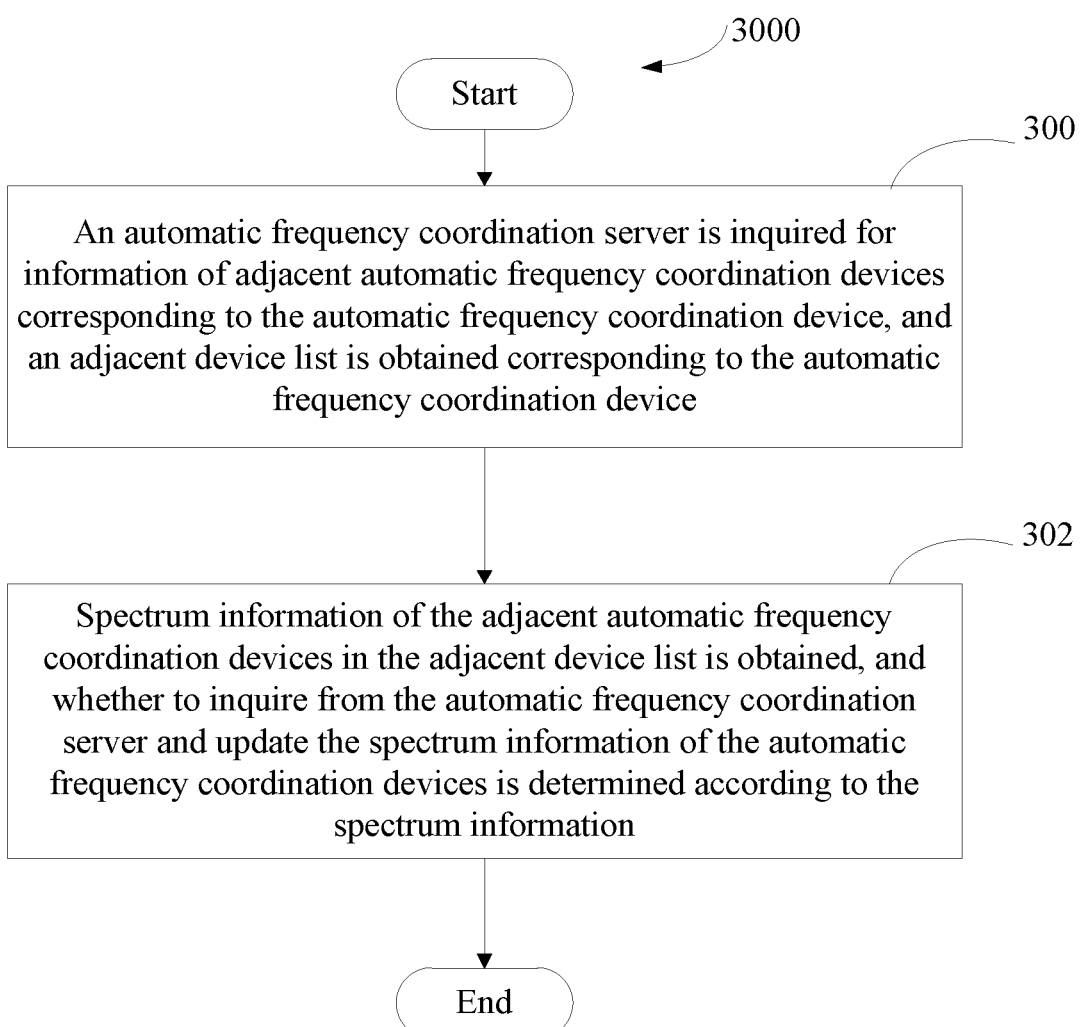
FIG. 3 is a flowchart of a spectrum inquiry method for automatic frequency coordination protocol according to an embodiment of the present disclosure.

Referring to FIG. 3, FIG. 3 is a flow chart of a spectrum inquiry method for automatic frequency coordination protocol according to the preferred embodiment of the present disclosure. The spectrum inquiry method for automatic frequency coordination protocol is applied to an automatic frequency coordination (AFC) device. Each block shown in FIG. 3 represents one or more processes, methods, or subroutines, carried out in the exemplary method 3000. Additionally, the illustrated order of blocks is by example only and the order of the blocks can be changed. The method 3000 can begin at block 300.

At block 300, an automatic frequency coordination server is inquired for information of adjacent automatic frequency coordination devices corresponding to the automatic frequency coordination device, and an adjacent device list is obtained corresponding to the automatic frequency coordination device.

Specifically, the automatic frequency coordination device inquires the automatic frequency coordination server for information of adjacent automatic frequency coordination devices through vendorExtensions, and the automatic frequency coordination server counts the adjacent device list according to geographic location information of all automatic frequency coordination devices.

At block 302, spectrum information of the adjacent automatic frequency coordination devices in the adjacent device list is obtained, and whether to inquire from the automatic frequency coordination server and update the spectrum information of the automatic frequency coordination devices is determined according to the spectrum information.

Specifically, the automatic frequency coordination device inquires the adjacent automatic frequency coordination devices in the adjacent device list through vendorExtensions to obtain spectrum information, and the spectrum information includes at least spectrum transmission power, and may also include Wi-Fi channels, frequency bands and so on.

The step of obtaining spectrum information of the adjacent automatic frequency coordination devices in the adjacent device list includes: actively inquiring the adjacent automatic frequency coordination devices to obtain the spectrum information.

Specifically, a step of actively inquiring the adjacent automatic frequency coordination devices to obtain the spectrum information, and determining, according to the spectrum information, whether to inquire from the automatic frequency coordination server and update the spectrum information of the automatic frequency coordination devices includes following blocks:

At block a, the automatic frequency coordination server is inquired for the spectrum information of the automatic frequency coordination device itself, and a first spectrum information of the automatic frequency coordination device itself is stored.

Specifically, the automatic frequency coordination device provides its own serial number, geographic location and other device description information to the automatic frequency coordination server, and the automatic frequency coordination server returns the frequency spectrum of the automatic frequency coordination device itself according to the serial number, geographic location and other device description information.

At block b, the automatic frequency coordination server is inquired for the adjacent device list corresponding to the automatic frequency coordination device.

At block c, the adjacent automatic frequency coordination devices in the adjacent device list are inquired for a second spectrum information of the adjacent automatic frequency coordination devices.

At block d, a difference degree $\Delta$ between the first spectral information and the second spectral information is calculated.

At block e, if the difference degree $\Delta$ exceeds a threshold value, a preset time period T is waited and then steps a to dare repeatedly executed, and execution times are accumulated.

At block f, if the difference degree $\Delta$ exceeds the threshold value for N consecutive times, a system administrator is notified, wherein the N is a preset positive integer greater than 1.

In the embodiment, under normal circumstances, the difference degree between the spectrum information of adjacent automatic frequency coordination devices is not large. Therefore, by actively inquiring about the spectrum information of adjacent automatic frequency coordination devices, whether there is a risk of tampering with the spectrum information obtained by the automatic frequency coordination server can be evaluated.

Furthermore, the step of obtaining spectrum information of the adjacent automatic frequency coordination devices in the adjacent device list further includes: the spectrum information of the adjacent automatic frequency coordination devices is passively obtained.

Specifically, a step of passively obtaining the spectrum information of the adjacent automatic frequency coordination devices, and determining, according to the spectrum information, whether to inquire from the automatic frequency coordination server and update the spectrum information of the automatic frequency coordination devices includes:

The automatic frequency coordination server is inquired for the spectrum information of the automatic frequency coordination device itself, and a third spectrum information of the automatic frequency coordination device itself is stored.

A fourth spectrum information of the adjacent automatic frequency coordination devices sent by the adjacent automatic frequency coordination devices is received.

Difference degree $\Delta$ between the third spectral information and the fourth spectral information is calculated.

If the difference degree $\Delta$ exceeds the threshold value, then the automatic frequency coordination server is inquired again for the spectrum information of the automatic frequency coordination device itself, and updating the spectrum information to latest spectrum information returned by the automatic frequency coordination server.

In the embodiment, the first spectrum information, the second spectrum information, the third spectrum information, and the fourth spectrum information are only for convenience of description, and are not intended to limit functions.

In the embodiment, in order to inquire the spectrum information from the automatic frequency coordination server more intelligently, when the spectrum information of the automatic frequency coordination device is updated, the automatic frequency coordination device actively updates the updated spectrum information to the adjacent automatic frequency coordination devices. In this way, after receiving the spectrum information of the adjacent automatic frequency coordination devices, the automatic frequency coordination device can calculate the spectrum difference degree $\Delta$ with its own spectrum information. If the difference degree $\Delta$ exceeds the threshold value, the automatic frequency coordination device will immediately update the spectrum information with the automatic frequency coordination server. If the difference degree $\Delta$ does not exceed the threshold value, there is no need to update the spectrum information to the automatic frequency coordination server.

Therefore, by passively obtaining the spectrum information of the adjacent automatic frequency coordination devices, the automatic frequency coordination device can evaluate whether it needs to inquire the frequency spectrum with the automatic frequency coordination server, so as to achieve more efficient spectrum updating.

In the embodiment, the automatic frequency coordination device queries the automatic frequency coordination server for the information of adjacent automatic frequency coordination devices to obtain a list of adjacent devices, and then the adjacent automatic frequency coordination devices are actively and passively inquired to obtain spectrum information. In this way, actively asking for spectrum information of adjacent devices can be used to assess whether the spectrum information obtained through the automatic frequency coordination server has the risk of being tampered with. The passively obtained spectrum information of adjacent devices can allow the automatic frequency coordination device to evaluate whether it needs to inquire about the frequency spectrum with the automatic frequency coordination server, so as to achieve more efficient spectrum update.

The embodiments shown and described above are only examples. Many details are often found in the art such as the other features of a spectrum inquiry method for automatic frequency coordination protocol. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A spectrum query method of automatic frequency coordination protocol, applied to an automatic frequency coordination protocol device, the method comprising:

inquiring an automatic frequency coordination server for information of adjacent automatic frequency coordination devices corresponding to the automatic frequency coordination device, and obtaining an adjacent device list corresponding to the automatic frequency coordination device; and obtaining spectrum information of the adjacent automatic frequency coordination devices in the adjacent device list, and determining, according to the spectrum information, whether to inquire from the automatic frequency coordination server and update the spectrum information of the automatic frequency coordination devices;

wherein, the step of obtaining spectrum information of the adjacent automatic frequency coordination devices in the adjacent device list comprises:

passively obtaining the spectrum information of the adjacent automatic frequency coordination devices; and a step of passively obtaining the spectrum information of the adjacent automatic frequency coordination devices, and determining, according to the spectrum information, whether to inquire from the automatic frequency coordination server and update the spectrum information of the automatic frequency coordination devices comprises:

inquiring the automatic frequency coordination server for the spectrum information of the automatic frequency coordination device, and storing a third spectrum information of the automatic frequency coordination device;

receiving a fourth spectrum information of the adjacent automatic frequency coordination devices sent by the adjacent automatic frequency coordination devices;

calculating difference degree $\Delta$ between the third spectral information and the fourth spectral information; and if the difference degree $\Delta$ exceeds the threshold value, then inquiring the automatic frequency coordination server again for the spectrum information of the automatic frequency coordination device itself, and updating the spectrum information to a latest spectrum information returned by the automatic frequency coordination server.

2. The spectrum query method of automatic frequency coordination protocol according to claim 1, the spectrum information comprises at least spectrum transmission power.

3. The spectrum query method of automatic frequency coordination protocol according to claim 1, the step of obtaining spectrum information of the adjacent automatic frequency coordination devices in the adjacent device list further comprises:

actively inquiring the adjacent automatic frequency coordination devices to obtain the spectrum information.

4. The spectrum query method of automatic frequency coordination protocol according to claim 3, a step of actively inquiring the adjacent automatic frequency coordination devices to obtain the spectrum information, and determining, according to the spectrum information, whether to inquire from the automatic frequency coordination server and update the spectrum information of the automatic frequency coordination devices comprises:

step a, inquiring the automatic frequency coordination server for the spectrum information of the automatic frequency coordination device itself, and storing a first spectrum information of the automatic frequency coordination device itself;

step b, inquiring the automatic frequency coordination server for the adjacent device list corresponding to the automatic frequency coordination device;

step c, inquiring the adjacent automatic frequency coordination devices in the adjacent device list for a second spectrum information of the adjacent automatic frequency coordination devices;

step d, calculating a difference degree $\Delta$ between the first spectral information and the second spectral information;

step e, if the difference degree $\Delta$ exceeds a threshold value, waiting for a preset time period T and repeatedly executing steps a to d, and accumulating execution times; and step f, if the difference degree Δ exceeds the threshold value for N consecutive times, notifying a system administrator, wherein the N is a preset positive integer greater than 1.

5. An automatic frequency coordination device, the device comprising:

at least one processor;

a storage unit; and one or more programs that are stored in the storage unit and executed by the at least one processor, the one or more programs comprising instructions for:

inquiring an automatic frequency coordination server for information of adjacent automatic frequency coordination devices corresponding to the automatic frequency coordination device, and obtaining an adjacent device list corresponding to the automatic frequency coordination device; and obtaining spectrum information of the adjacent automatic frequency coordination devices in the adjacent device list, and determining, according to the spectrum information, whether to inquire from the automatic frequency coordination server and update the spectrum information of the automatic frequency coordination devices;

wherein, the step of obtaining spectrum information of the adjacent automatic frequency coordination devices in the adjacent device list comprises:

passively obtaining the spectrum information of the adjacent automatic frequency coordination devices; and a step of passively obtaining the spectrum information of the adjacent automatic frequency coordination devices, and determining, according to the spectrum information, whether to inquire from the automatic frequency coordination server and update the spectrum information of the automatic frequency coordination devices comprises:

inquiring the automatic frequency coordination server for the spectrum information of the automatic frequency coordination device, and storing a third spectrum information of the automatic frequency coordination device;

receiving a fourth spectrum information of the adjacent automatic frequency coordination devices sent by the adjacent automatic frequency coordination devices;

calculating difference degree Δ between the third spectral information and the fourth spectral information; and if the difference degree Δ exceeds the threshold value, then inquiring the automatic frequency coordination server again for the spectrum information of the automatic frequency coordination device itself, and updating the spectrum information to a latest spectrum information returned by the automatic frequency coordination server.

6. The automatic frequency coordination device according to claim 5, wherein the spectrum information comprises at least spectrum transmission power.

7. The automatic frequency coordination device according to claim 5, the step of obtaining spectrum information of the adjacent automatic frequency coordination devices in the adjacent device list further comprises:

actively inquiring the adjacent automatic frequency coordination devices to obtain the spectrum information.

8. The automatic frequency coordination device according to claim 7, a step of actively inquiring the adjacent automatic frequency coordination devices to obtain the spectrum information, and determining, according to the spectrum information, whether to inquire from the automatic frequency coordination server and update the spectrum information of the automatic frequency coordination devices comprises:

step a, inquiring the automatic frequency coordination server for the spectrum information of the automatic frequency coordination device itself, and storing a first spectrum information of the automatic frequency coordination device itself;

step b, inquiring the automatic frequency coordination server for the adjacent device list corresponding to the automatic frequency coordination device;

step c, inquiring the adjacent automatic frequency coordination devices in the adjacent device list for a second spectrum information of the adjacent automatic frequency coordination devices;

step d, calculating a difference degree Δ between the first spectral information and the second spectral information;

step e, if the difference degree Δ exceeds a threshold value, waiting for a preset time period T and repeatedly executing steps a to d, and accumulating execution times; and step f, if the difference degree Δ exceeds the threshold value for N consecutive times, notifying a system administrator, wherein the N is a preset positive integer greater than 1.

* * * * *